United States Patent [19]
Hongo et al.

[11] Patent Number: 5,631,344
[45] Date of Patent: May 20, 1997

[54] BLOCK COPOLYMER OF POLYESTERS AND POLYCARBONATES AND PROCESS FOR PREPARATION THEREOF

[75] Inventors: Hideyuki Hongo; Akio Yamaguchi; Yoji Hori; Toshimitsu Hagiwara; Yoko Takahashi, all of Kanagawa, Japan

[73] Assignee: Takasago Koryo Kogyo Kabushiki Kaisha (Takasago International Corporation), Tokyo, Japan

[21] Appl. No.: 549,544

[22] Filed: Oct. 27, 1995

[30] Foreign Application Priority Data

Oct. 28, 1994 [JP] Japan ............................... 6-287178

[51] Int. Cl.$^6$ .................................................. C08G 63/78
[52] U.S. Cl. ................... 528/283; 525/439; 528/196; 528/198; 528/199; 528/200; 528/271; 528/272; 528/354; 528/355; 528/359
[58] Field of Search ............................. 528/359, 354, 528/355, 176, 271, 272, 283, 196, 198, 199, 200; 525/439

[56] References Cited

FOREIGN PATENT DOCUMENTS 0601885  6/1994  European Pat. Off. .
0640637  3/1995  European Pat. Off. .

*Primary Examiner*—Terressa M. Mosley
*Attorney, Agent, or Firm*—Sughrue, Mion, Zinn, Macpeak & Seas

[57] ABSTRACT

The block copolymer of polyesters and polycarbonates comprises at least one of each of the constituting units of (I) and (II) having the general formulae:

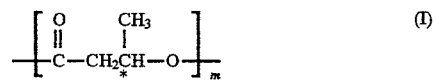

(I)

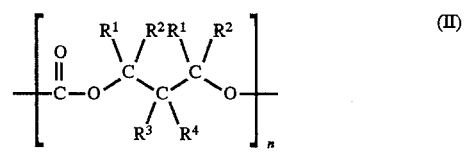

(II)

where the sign * indicates an asymmetric carbon atom; $R_1$, $R^2$, $R^3$ and $R^4$ are either a hydrogen atom or a methyl group; m and n are respective a natural numbers ranging from 300 to 5000: The block copolymer is obtained by successive ring-opening and copolymerization of optically active β-butyrolactones and cyclic carbonates in the presence of a catalyst.

The block polymer obtained has high molecular weight and high melting temperature, and can thus be used as a high strength material for practical use and which has biodegradable and hydrolyzable nature.

18 Claims, 1 Drawing Sheet

Reaction days expressed by number of weeks

BLOCK COPOLYMER OF POLYESTERS AND POLYCARBONATES AND PROCESS FOR PREPARATION THEREOF

BACKGROUND OF THE INVENTION

1. Field of the Invention

The present invention relates to a block copolymer of polyesters and polycarbonates and a process for their preparation. More particularly, the present invention relates to biodegradable and hydrolyzable thermoplastic resin. The copolymer of the invention is decomposable by microorganisms living in the soil or in the water, so that it can be used as non-polluting and clean plastic material. This quality gives the polymer a broad scope of uses, functionally as varied as a material for a fishing line, a fishing net, a sheet for agricultural use, a packing film, a surface film for paper packing, a material for lamination layers, a plasticizer, a compatibilizer etc.

Also, the polymer according to the invention is biocompatible, so that it can be hydrolyzed and absorbed by a living body. It may therefore be used in medical materials e.g. for surgical sutures or clips without requiring the extraction of stitches.

2. Prior Art

In recent years, the environmental pollution caused by the disposal of non-degradable or difficultly degradable films or fishing lines has become an important issue. To solve this problem, attempts have been made to find a plastic material that is easily degradable by the micro-organisms living in nature. Also, there is currently research into a biocompatible plastic material that can be degraded and absorbed by living bodies. In this case, the material preferably has to maintain its strength only during the regeneration of tissue and to disappear rapidly thereafter.

Aliphatic polyesters are known to be biodegradable and bio-compatible. Among them, poly (R)-3-hydroxybutyric acid (hereinafter referred to as P[(R)-3HB]) accumulated in microbial cells is drawing particular attention because it is a thermoplastic resin having a high melting temperature, e.g. around 180° C. (cf. "Biodegradable Macromolecular Materials", edited by Yoshiharu DOI, p21, 1990, published by Kogyo Chosa Kai). There exist many known microorganisms that accumulate various kinds of poly (R)-3-hydroxyalkanoic acid in their cells (page 26 of the aforementioned document).

A copolymer of (R)-3-hydroxybutyric acid and (R)-3-hydroxyvaleric acid that shows improved properties over the polymer P[(R)-3HB] was reported by P. A. HOLMES (Phys. Technol., 1985 (16), p32). Also, a copolymer of (R)-3-hydroxybutyric acid and 4-hydroxybutyric acid was reported by Y. DOI et al. (Polym. Commun., 1988 (29), 174). These copolymers are formed as random copolymers (Macromolecules 1986 (19), 2860; Macromolecules, 1988 (21), 2722).

Recently, various random copolymers of polyesters of bio-degradable high molecules containing (R)-3-hydroxybutyric acid units were chemically synthesized in the presence of a distannoxane catalyst: the copolymerisation was effected by ring-opening of (R)-β-butyrolactone (hereinafter referred to as (R)-BL) and of various other lactones (Macromolecules, 1993 (26), 4388).

Meanwhile, random copolymers of glycolides and lactides have already been used for bio-absorbable surgical sutures ("Bio-compatible materials—their functions and applications", 1993, p127, edited by Yoshito IKADA, published by Nippon Kikaku Kyokai).

The random copolymers of polyesters synthesized as described above decrease their crystallinity and reduce their fragility. On the other hand, the random copolymerisation usually lowers the melting temperature. Therefore, to obtain a biodegradable aliphatic polyester having a melting temperature at least as high as 100° C., the polymer has to contain a large proportion of optically active units of 3-hydroxybutyric acid or of L-lactic acid, or glycolic acid units. This in turn poses a serious industrial problem due to increased production costs. Further, it is a rather difficult task to obtain a soft film or rubber from the random copolymers while simultaneously maintaining a high melting temperature and strength.

To solve the problem, block copolymers of polyesters or block copolymers of polyesters and polycarbonates may preferably be synthesized. According to M. S. Reeve et al. (Macromolecules, 1993 (26), 888), a microbially produced polymer P[(R)-3HB] was submitted to a methanolysis to obtain oligomers. Terminal hydroxyl groups of the obtained oligomers were then reacted with triethylaluminium, thereby forming polymerisation starters. Subsequently, the starters were reacted with ε-caprolactone (referred to as CL), L-lactide (L-LA) or D,L-lactide (DL-LA) to obtain a block copolymer of polyesters P[(R)-3HB] and poly ε-caprolactone, referred to as P[(R)-3HB]-PCL, a block copolymer of polyesters P[(R)-3HB] and poly L-lactide, referred to as P[(R)-3HB]-P(L-LA) and a block copolymer of polyesters P[(R)-3HB] and poly D,L-lactide, referred to as P[(R)-3HB]-P(DL-LA). However, in this method, the microbially produced polymer P[(R)-3HB] is used as a starting material, thereby incurring a higher production cost.

On the other hand, block copolymers of polyesters and polycarbonates were reported in U.S. Pat. No. 4,243,775 and international application WO 89/05664. These are block copolymers of lactones and carbonates obtained by using alcohols as starters in the presence of tin-type catalyst.

Further block copolymers of lactones and carbonates were also obtained by using polyethyleneglycols as starters in the presence of tin-type catalyst and reported in U.S. Pat. No. 4,857,602. Yet further block copolymers of lactones and carbonates were obtained by using butyl lithium as catalyst and reported in DE 3 607 627 A1. Further, other lactone-carbonate type block copolymers were disclosed in EP 0 427 185 A2.

To copolymerize lactones and cyclic carbonates in block, it is necessary to rely upon a living polymerization: first lactones are ring-opened and polymerized in the presence of a catalyst; then the terminals of the polymer formed are bound to the catalyst and kept in an active state. Subsequently, when cyclic carbonates are added, these are inserted successively between the polymer terminals and the catalyst, thereby extending the block copolymer chain of polyesters and polycarbonates.

However, in the system of catalysts reported in the aforementioned documents, high molecular block copolymers of polyesters and polycarbonates could not be obtained between lactones, especially (R)-BL or (S)-BL, and cyclic carbonates.

SUMMARY OF THE INVENTION WITH OBJECTS

Accordingly, it is an object of the present invention to produce a new high molecular block copolymer of polyesters and polycarbonates having good biodegradability and hydrolyzability and to propose an industrially advantageous process for their preparation.

To solve the above-mentioned problem, there is provided a block copolymer of polyesters and polycarbonates comprising at least one of each of the constituting units (I) and (II) having the general formulae:

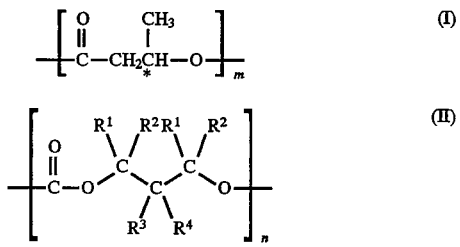

where the sign * indicates an asymmetric carbon atom; $R^1$, $R^2$, $R^3$ and $R^4$ are either a hydrogen atom or a methyl group; m and n are respectively a natural number ranging from 300 to 5,000.

In typical cases, the proportion of monomers contained in the constituting unit (I) to those contained in the constituting unit (II) may range from 10:90 to 90:10, preferably from 20:80 to 80:20, most preferably from 30:70 to 70:30. The weight-average molecular weight may range from 60,000 to 1,000,000, preferably from 75,000 to 800,000 and most preferably from 100,000 to 500,000.

The block copolymer according to the invention preferably has a melting temperature around, or higher than, 115° C. In the above-mentioned formula (II), $R^1$, $R^2$, $R^3$ and $R^4$ are preferably hydrogen atoms. With this choice, the product tends to be more easily bio-degradable.

In a preferred embodiment, the proportion of monomers contained in the constituting unit (I) is approximately equal to, or higher than, those contained in constituting unit (II). With this choice, the resulting copolymers tend to be more easily bio-degradable.

In a variant of the invention, the block copolymer of polyesters and polycarbonates may comprise, as a first moiety, the copolymer having at least one of each of the constituting units (I) and (II) and, as a second moiety, further polyesters of a formula corresponding to that of unit (I), or further polycarbonates of a formula corresponding to that of unit (II) but having a different monomer constituent from the first moiety, giving rise respectively to ABA type or ABC type copolymer.

Another object of the invention is to provide a process for preparing the block copolymer of polyesters and polycarbonates, the process comprising the steps of:

a) ring-opening and polymerizing optically active β-butyrolactones in the presence of a catalyst, whereby a reaction mixture is obtained;

b) adding cyclic carbonates to said reaction mixture; and c) ring-opening and polymerizing the cyclic carbonates; the process being repeated where appropriate.

To prepare the block copolymer of polyesters and polycarbonates having a second moiety composed solely of polyesters or of polycarbonates, the process further comprises the step of d) adding optically active β-butyrolactones or cyclic carbonates corresponding to the monomers of unit (II) but differing from those used in steps a) to c) and subsequently ring-opening and polymerizing the added compounds. The whole process may be repeated where appropriate.

The catalyst may be a tin-containing catalyst. The tin-containing catalyst is preferably a distannoxane having the general formula (III):

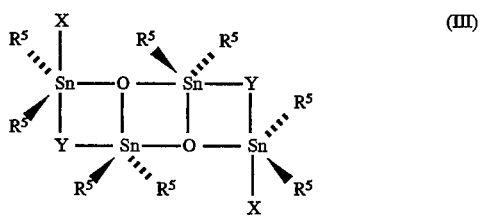

where $R^5$ indicates an alkyl group having 1 to 12 carbon atoms, an aralkyl group having at most 12 carbon atoms or a phenyl group; X is selected from the group consisting of Cl, Br and NCS; and Y is selected from the group consisting of Cl, Br, NCS, OH, an alkoxy group having 1 to 4 carbon atoms and a phenoxy group.

The preferred distannoxane is 1-ethoxy-3-halogenotetraalkyl distannoxane, the alkyl group having 4 to 12 carbon atoms.

In practice, the product (R)-BL or (S)-BL was found to be easily ring-opened and polymerised by a distannoxane complex and, when the product (R)-BL or (S)-BL is successively added, to produce a high molecular polyester. Also when the product (R)-BL, for example, then cyclic carbonates, was successively added, a block copolymer of polyesters and polycarbonates having a high molecular weight was obtained. The new product has a high melting temperature, exceeding 100° C., and high strength, so that it can serves as a material for a wide range of practical uses. It can also be formed into a flexible thermoplastic resin having good bio-degradability and hydrolyzability.

Up to now, there seems to exist no report of a block copolymer of polyesters and polycarbonates obtained by successively ring-opening and copolymerising optically active β-butyrolactones and cyclic carbonates.

Another object of the present invention is to provide bio-degradable articles or bio-compatible articles comprising the block copolymer thus obtained. The articles may be used e.g. as a fishing line or net, a film, a packing film or as a sheet for agricultural use. They may also find new applications such as a thermo-resistant film for containing hot water or heating in an electrical range such a microwave oven, a surface film for a paper cup, a material for lamination layers, a plasticizer, a compatibility-lending material or the like.

The material may also be used for medical articles such as surgical sutures, clips or the like.

Optically active (R)-β-butyrolactone and (S)-β-butyrolactone starting materials for the block copolymer of polyesters and polycarbonates of the present invention can easily be obtained by the method disclosed in the documents by the present applicants, JP-A-Hei 4-210 683 and JP-A-Hei 5-345 867, according to which diketenes are asymmetrically hydrogenised in the presence of ruthenium-optically active phosphine complex as catalyst.

The cyclic carbonates, which constitute another starting material of the invention, may e.g. comprise trimethylene carbonate, 2,2-dimethyltrimethylene carbonate, 2-methyltrimethylene carbonate, 3-methyltrimethylene carbonate, 2,3-dimethyltrimethylene carbonate, 2,4-dimethyltrimethylene carbonate, 2,3,4-trimethyltrimethylene carbonate, and 2,3,3,4-tetramethyltrimethylene carbonate. These cyclic carbonates can easily be obtained by dripping triethylamine in a toluene solution of corresponding diol and chloroethylformate cooled in an ice-water bath (see Takeshi Endo et al., preliminary manuscript for lecture II, 61st Spring time annual meeting of the Chemical Society of Japan, 1991, p1910, Juridical Person Chemical Society of Japan).

According to the invention, at least one compound among these cyclic carbonates is used and, when appropriate, several compounds thereof may be used together.

In the block copolymerisation according to the invention, an optically active β-butyrolactone is placed in a reactor with an inert solvent or without solvent under inert gas such as nitrogen or argon, and then a catalyst as described hereafter is added thereto. A first step to polymerisation is effected at a temperature ranging from 60° to 180° C. under atmospheric pressure for 30 minutes to 5 hours. To the resultant solution is added a small amount of inert solvent, thereby lowering the viscosity of the solution. Thereafter, a second step of reaction is effected by adding cyclic carbonate, dissolved in a small amount of inert solvent, to the solution and by further reacting the mixture for 1 to 20 hours. An AB type-block copolymer can thus be obtained.

An ABA type, an ABC type, etc, of the block copolymers are obtained by reacting the AB type-block copolymer with optically active β-butyrolactones or with cyclic carbonates corresponding to the monomers of unit (II) but differing from those used for the AB type according to the method described for the second step of copolymerization.

For this copolymerization reaction, tin-containing catalysts, for example distannoxanes etc., may be used. As other types of tin-containing catalysts, dibutyltin oxide, stannous octoate, dibutyltin dilaurate may be cited. The distannoxane catalysts having the above-mentioned formula (III) comprise for example 1,3-dihalogenotetraalkyl distannoxanes such as 1,3-dichlorotetrabutyl distannoxane, 1,3-dichlorotetraphenyl distannoxane, 1,3-dibromotetrabutyl distannoxane, etc.; 1-hydroxy-3-halogenotetraalkyl distannoxanes such as 1-hydroxy-3-chlorotetrabutyl distannoxane, 1-hydroxy-3-bromo tetrabutyl distannoxane, etc.; 1-alkoxy-3-halogenotetraalkyl distannoxanes such as 1-methoxy-3-chlorotetrabutyl distannoxane, 1-ethoxy-3-chlorotetrabutyl distannoxane, 1-ethoxy-3-chlorotetraoctyl distannoxane, 1-ethoxy-3-chlorotetradodecyl distannoxane, 1-phenoxy-3-chlorotetrabutyl distannoxane, 1-methoxy-3-bromotetrabutyl distannoxane, 1-ethoxy-3-bromotetrabutyl distannoxane, 1-phenoxy-3-bromotetrabutyl distannoxane, etc.; 1-hydroxy-3-(isothiocyanato)tetraalkyl distannoxanes such as 1-hydroxy-3-(isothiocyanato)tetrabutyl distannoxane etc.; 1-alkoxy-3-(isothiocyanato)tetraalkyl distannoxanes such as 1-methoxy-3-(isothio cyanato)tetrabutyl distannoxane, 1-ethoxy-3-(isothiocyanato)tetrabutyl distannoxane, 1-ethoxy-3-(isothiocyanato)tetrahexyl distannoxane, 1-ethoxy-3-(isothiocyanato)tetradecyl distannoxane, 1-phenoxy-3-(isothiocyanato)tetrabutyl distannoxane, etc.; and 1,3-bis(isothiocyanato)tetraalkyl distannoxanes such as 1,3-bis(isothiocyanato)tetrabutyl distannoxane, 1,3-bis(isothiocyanato)tetramethyl distannoxane, etc.

These catalysts are easily synthesized by reacting dibutyltin oxide and dibutyltin diisothiocyanate in ethanol, as is described for example in J. Organomet. Chem., 1965(3),70, for the synthesis of 1,3-dichlorotetraphenyl distannoxane and in J. Org. Chem., 1991(56),5307 for the synthesis of 1-hydroxy-3-(isothiocyanate)tetrabutyl distannoxane.

The present invention uses at least one such catalyst and, when appropriate, several such catalysts together.

The catalyst is added in a proportion of 1/500 to 1/40,000 moles relative to the starting monomers, and preferably of 1/1,000 to 1/20,000 moles.

Any of the usual solvents for ring-opening polymerisation may be used. These include linear or cyclic ethers such as diisopropylether, tetrahydrofuran, 1,4-dioxane or the like, halogenated organic compounds such as methylene bromide, dichloroethane or the like, aromatic compounds such as toluene, benzene, xylene or the like and mixtures thereof.

These solvents may be a refined product of commercial solvents: a solvent may be refined by adding metallic sodium and benzophenone and by distillating under inert gas, then preserved in inert gas until use.

DETAILED DESCRIPTION OF THE PREFERRED EMBODIMENTS

Figure 1:
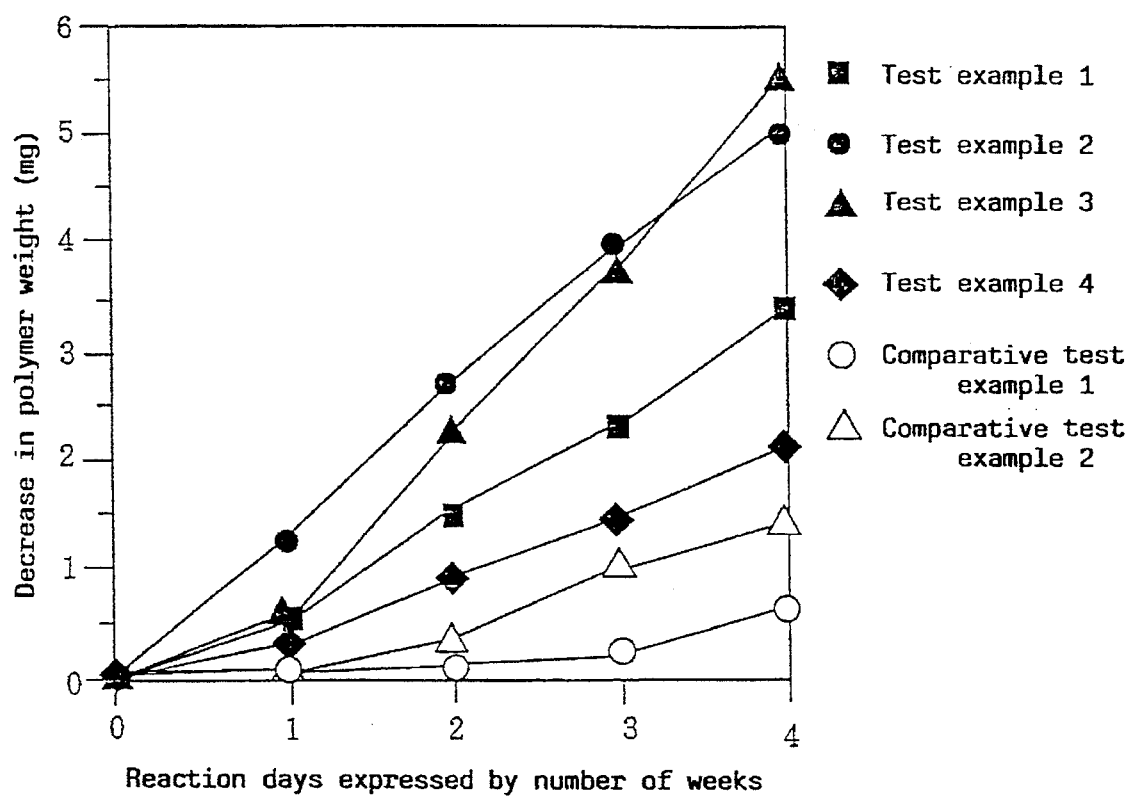

The above and other objects, features and advantages of the invention will be apparent from the following description of the preferred embodiments, given as a non-limiting example.

The following analyses were used for the examples and test examples in the present invention and apparatus for the bio-degradability tests:

1) Nuclear magnetic resonance spectrum (NMR): AM-400 type (400 MHz) device made by Bruker Corp.

2) Molecular weight: D-2520 GPC integrator made by Hitachi Seisaku Sho.

3) Differential scanning calorimeter (DSC): DSC 50 made by Shimadzu Seisaku Sho

4) Thermogravimetric analyser (TGA): TGA 50 made by Shimadzu Seisaku Sho

5) Bio-degradability test: activated sludge, purchased from the "Kagakuhin Kensa Kyokai" foundation on Jan. 20th,1994.

Each type of measurement was effected by using the above-mentioned devices and according to the method described in the article "Decomposition tests of chemical compounds by using, inter alia, micro-organisms" provided in "Kan Po Gyo No.5", "Yaku Hatsu No.615" and "49 Ki Kyoku No 392", Jul. 13, 1974 under the title "Testing methods relating to new chemical compounds" and also according to the article by Y. Doi, A. Segawa and M. Kunioka, Int. J. Biol. Macromol., 1990, Vol.12,April,106.

For the examples and comparative examples mentioned herebelow, Table 1 collectively indicates the monomer use ratio (molar ratio) in the synthesis of a block copolymer of polyesters and polycarbonates, as well as the monomer content ratio, weight-average molecular weight (Mw), number-average molecular weight (Mn), glass transition temperature (Tg), melting temperature (Tm) and decomposition temperature (Td) of said block copolymer.

EXAMPLE 1

Synthesis of AB type block polyesters-polycarbonates (referred to hereinafter as P[(R)-3HB]-PTMC) through successive ring-opening and copolymerisation of (R)-β-butyrolactone ((R)-BL) and trimethylene carbonate (TMC).

2.00 g (23 mmol) of (R)-BL and 25.3 mg (0.0225 mmol) of 1-ethoxy-3-chlorotetrabutyl distannoxane were prepared in a 30 ml reactor and stirred for one hour at 100° C. under argon (Ar). To the reaction solution was added 0.5 ml of toluene. After 5 minutes, 5.07 g (50 mmol) of TMC dissolved in 0.5 ml of toluene were further added thereto. Then, the mixture was reacted for one hour. The resulting product was dissolved in chloroform and precipitated by introducing it into a mixture solution (1:3) of diethylether and hexane. 5.62 g of the block polymer subject of the example were obtained with a yield of 79.5%.

EXAMPLE 2

Synthesis of P[(R)-3HB]-PTMC through successive ring-opening and copolymerisation of (R)-BL and TMC. 7.15 g (83 mmol) of (R)-BL and 22.8 mg (0.0203 mmol) of 1-ethoxy-3-chlorotetrabutyl distannoxane were prepared in a 30 ml reactor and stirred for 1.5 hours at 100° C. under an Ar atmosphere. 0.5 ml of toluene was added to the reaction solution and, after 20 minutes, 3.42 g (34 mmol) of TMC dissolved in 0.5 ml of toluene were further added thereto.

Then, the mixture was reacted for 1.5 hours. The resulting product was dissolved in chloroform and precipitated by introducing it into a mixture solution (1:3) of diethylether and hexane. 7.75 g of the block polymer subject of the example was obtained with 73.3% of yield.

EXAMPLE 3

Synthesis of P[(R)-3HB]-PTMC through successive ring-opening and copolymerisation of (R)-BL and TMC. 4.65 g (54 mmol) of (R)-BL and 22.0 mg (0.014 mmol) of 1-ethoxy-3-chlorotetraoctyl distannoxane were prepared in a 30 ml reactor and stirred for 1.5 hours at 100° C. under Ar atmosphere. 0.5 ml of toluene was added to the reaction solution and, after 30 minutes, 5.46 g (54 mmol) of TMC dissolved in 0.5 ml of toluene were further added thereto. Then, the mixture was reacted for 4.5 hours. The resulting product was dissolved in chloroform and precipitated by introducing it into a mixture solution (1:3) of diethylether and hexane. 8.69 g of the block polymer subject of the example were obtained with 86.0% of yield.

EXAMPLE 4

Synthesis of P[(R)-3HB]-PTMC through successive ring-opening and copolymerisation of (R)-BL and TMC. 3.72 g (43 mmol) of (R)-BL and 11.6 mg (0.01 mmol) of 1-hydroxy-3-(isothiocyanate)tetrabutyl distannoxane were prepared in a reactor of 30 ml and stirred for 2.5 hours at 100° C. under Ar atmosphere. 0.5 ml of toluene was added to the reaction solution. After one hour, 4.04 g (40 mmol) of TMC dissolved in 0.3 ml of toluene were further added to the mixture. Then, the mixture was reacted for 6 hours. The resulting product was dissolved in chloroform and precipitated by introducing it into a mixture solution (1:3) of diethylether and hexane. 3.41 g of the block polymer subject of the example was obtained with 43.9% of yield.

EXAMPLE 5

Synthesis of P[(R)-3HB]-PTMC through successive ring-opening and copolymerisation of (R)-BL and TMC. 4.56 g (53 mmol) of (R)-BL and 23.6 mg (0.023 mmol) of 1-hydroxy-3-(isothiocyanate)tetrabutyl distannoxane were prepared in a reactor of 30 ml and stirred for 1.5 hours at 100° C. under Ar atmosphere. 0.5 ml of toluene was added to the reaction solution and, after 30 minutes, 5.37 g (53 mmol) of TMC dissolved in 0.3 ml of toluene were further added thereto. Then, the mixture was reacted for 3 hours. The resulting product was dissolved in chloroform and precipitated by introducing it into a mixture solution (1:3) of diethylether and hexane. 8.81 g of the block polymer subject of the example were obtained with 88.7% yield.

EXAMPLE 6

Synthesis of P[(R)-3HB]-PTMC through successive ring-opening and copolymerisation of (R)-BL and TMC. 4.92 g (57 mmol) of (R)-BL and 27.3 mg (0.026 mmol) of 1-hydroxy-3-chlorotetrabutyl distannoxane were prepared in a reactor of 30 ml and stirred for 1.5 hours at 100° C. under Ar atmosphere. 0.5 ml of toluene was added to the reaction solution. After 15 minutes, 5.85 g (57 mmol) of TMC dissolved in 0.3 ml of toluene were further added thereto. Then the mixture was reacted for 4 hours. The resulting product was dissolved in chloroform and precipitated by introducing it into a mixture solution (1:3) of diethylether and a hexane. 7.22 g of the block polymer subject of the example was obtained with 67.1% yield.

EXAMPLE 7

Synthesis of AB type block polyesters-polycarbonates (referred to hereinafter as P[(R)-3HB]-PDTC) through successive ring-opening and copolymerisation of (R)-BL and 2,2-dimethyltrimethylene carbonate (hereinafter, DTC). 3.89 g (45 mmol) of (R)-BL and 23.8 mg (0.021 mmol) of 1-ethoxy-3-chlorotetrabutyl distannoxane were prepared in a reactor of 30 ml and stirred for 50 minutes at 100° C. under Ar atmosphere. 0.5 ml of toluene was added to the reaction solution. After 20 minutes, 5.94 g (46 mmol) of DTC dissolved in 1.0 ml of toluene were further added to the mixture. Then, the mixture was reacted for 4 hours. The resulting product was dissolved in chloroform and precipitated by introducing it into a methanol solution. 7.58 g of the block polymer subject of the example were obtained with 77.1% yield.

Comparative example 1

Synthesis of AB type block polyesters-polycarbonates (referred to hereinafter as P[(±)-3HB]-PTMC) through successive ring-opening and copolymerisation of (±)-β-butyrolactone (hereinafter (±)-BL) and TMC.

5.53 g (64 mmol) of (±)-BL and 28.2 mg (0.025 mmol) of 1-ethoxy-3-chlorotetrabutyl distannoxane were prepared in a reactor of 30 ml and stirred for 40 minutes at 100° C. under Ar atmosphere. 0.5 ml of toluene was added to the reaction solution. After 10 minutes, 6.70 g (66 mmol) of TMC dissolved in 0.5 ml of toluene were further added thereto. Then, the mixture was reacted for 1.6 hours. The resulting product was dissolved in chloroform and precipitated by introducing it into a mixture solution (1:3) of diethylether and hexane. 12.2 g of the block polymer subject of the example was obtained with 99.5% yield.

Comparative example 2

Synthesis of AB type block polyesters-polycarbonates (referred to hereinafter as PCL-PTMC) through successive ring-opening and copolymerisation of ε-caprolactone (hereinafter ε-CL) and TMC.

4.37 g (38 mmol) of ε-CL and 20.8 mg (0.0185 mmol) of 1-ethoxy-3-chlorotetrabutyl distannoxane and 4.0 ml of toluene were prepared in a reactor of 30 ml and stirred for 35 minutes at 70° C. under Ar atmosphere. 3.95 g (39 mmol) of TMC dissolved in 2.0 ml of toluene was added to the reaction solution and, after 20 minutes, 3.0 ml of toluene were further added thereto. Then, the mixture was reacted for one hour. The resulting product was dissolved in chloroform and precipitated by introducing it into a methanol solution. 7.89 g of the block polymer subject of the example were obtained with 94.8% yield.

Test example 1:

biodegradability test of the polymer according to example 1.

Activated sludge was prepared in an amount of 500 ppm (600 ml) and used at pH 6.0 to 7.0 at 25° C. The polymer according to example 1 was formed into a film of 1 cm×1 cm square and 0.05 to 0.1 mm thick: the polymer was dissolved in chloroform, poured on a disk and made into a film after solvent evaporation. 17 to 25 mg of polymer film were placed in 50 ml of flask containing 30 ml of activated sludge and the flask was stirred in a water thermostat manufactured by Tytech Ltd.

The decrease in polymer weight was determined after 1, 2, 3 and 4 weeks.

FIG. 1 shows a result in which the polymer according to example 1 loses 3.36 mg weight after 4 weeks.

Test example 2

Bio-degradability test of the polymer according to example 2.

The polymer obtained in example 2 was submitted to the bio-degradability test as described for test example 1. The result is shown in FIG. 1, which indicates a weight decrease of 4.99 mg after 4 weeks.

Test example 3

Bio-degradability test of the polymer according to example 3.

The polymer obtained in example 3 was submitted to the bio-degradability test as described for test example 1. The result is shown in FIG. 1, which indicates a weight decrease of 5.51 mg after 4 weeks.

Test example 4

Bio-degradability test of the polymer according to example 7.

The polymer obtained in example 7 was submitted to the bio-degradability test as described for test example 1. The result is shown in FIG. 1, which indicates a weight decrease of 2.10 mg after 4 weeks.

Comparative test example 1

Bio-degradability test of the polymer according to comparative example 1.

The polymer obtained in comparative example 1 was submitted to the bio-degradability test as described for test example 1. The result is shown in FIG. 1, which indicates a weight decrease of 0.19 mg after 4 weeks.

Comparative example 2

Bio-degradability test of the polymer according to comparative example 2.

The polymer obtained in comparative example 2 was submitted to the bio-degradability test as described for test example 1. The result is shown in FIG. 1, which indicates a weight decrease of 1.42 mg after 4 weeks.

TABLE 1

|  | Monomer use ratio | Monomer Content Ratio | Mw | Mn | Tg (°C.) | Tm (°C.) | Td (°C.) |
| --- | --- | --- | --- | --- | --- | --- | --- |
| Example 1 | (R)-BL/TMC 30/70 | 30/70 | 150000 | 88000 | −10 | 80,157 | 284 |
| Example 2 | (R)-BL/TMC 70/30 | 84/16 | 160000 | 85000 | −18 | 74,148 | 276 |
| Example 3 | (R)-BL/TMC 50/50 | 51/49 | 182000 | 115000 | −14 | 76,137 | 261 |
| Example 4 | (R)-BL/TMC 50150 | 64/36 | 108000 | 70000 | * | 82,131 | 248 |
| Example 5 | (R)-BL/TMC 50/50 | 50/50 | 180000 | 110000 | −13 | 79,137 | 273 |
| Example 6 | (R)-BL/TMC 50/50 | 55/45 | 169000 | 98000 | −13 | 83,138 | 288 |
| Example 7 | (R)-BL/DTC 50/50 | 55/45 | 142000 | 88000 | −1 | 47,118 | 274 |
| Comparative Example 1 | (±)-BL/TMC 50/50 | 45/55 | 170000 | 105000 | −12 | 58 | 281 |
| Comparative Example 2 | εE-CL/TMC 50/50 | 50/50 | 270000 | 159000 | −50 | * | 283 |

The signs "*" in the column of Tg (°C.) and Tm (°C.) mean that no measureable peak is observed.

What is claimed is:

1. Block copolymer of polyesters and polycarbonates comprising at least one of each of the units (I) and (II) having the general formulae:

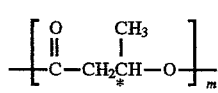
(I)

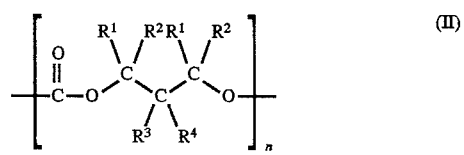
(II)

where the symbol * indicates an asymmetric carbon atom; $R^1$, $R^2$, $R^3$, and $R^4$ are either a hydrogen atom or a methyl group; and m and n are each respective natural numbers ranging from 300 to 5,000, wherein said copolymer comprises block units of (I)-(II), (II)-(I), (I)-(II)-(I), (II)-(I)-(II), (I)-(II)-(X), or (II)-(I)-(X), wherein (I) and (II) are structural units as defined above, and (X) is a structural unit other than (I) or (II).

2. Block copolymer of polyesters and polycarbonates according to claim 1, wherein the proportion of monomers contained in constituting unit (I) to those contained in constituting unit (II) ranges from 10:90 to 90:10, and wherein the weight-average molecular weight ranges from 60,000 to 1,000,000.

3. Block copolymer of polyesters and polycarbonates according to claim 1, wherein the weight-average molecular weight ranges from 100,000 to 500,000.

4. Block copolymer of polyesters and polycarbonates according to claim 1, wherein the melting temperature is at least 115° C.

5. Block copolymer of polyesters and polycarbonates according to claim 1, wherein $R^1$, $R^2$, $R^3$ and $R^4$ are hydrogen atoms.

6. Block copolymer of polyesters and polycarbonates according to claim 1, wherein the proportion of monomers contained in the constituting unit (I) is at least equal to those contained in the constituting unit (II).

7. A process for preparing a block copolymer of polyesters and polycarbonates comprising at least one of each of the units (I) and (II) having the general formulae:

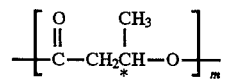
(I)

-continued

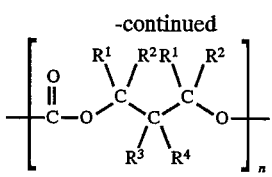
(II)

where the symbol * indicates an asymmetric carbon atom; $R^1$, $R^2$, $R^3$, and $R^4$ are either a hydrogen atom or a methyl group; and m and n are each respective natural numbers ranging from 300 to 5,000, wherein said copolymer comprises block units of (I)-(II), (II)-(I), (I)-(II)-(I), (II)-(I)-(II), (I)-(II)-(X), or (II)-(I)-(X), wherein (I) and (II) are structural units as defined above, and (X) is a structural unit other than (I) or (II), the process comprising a repeatable sequence of steps of:

a) ring-opening and polymerizing optically active β-butyrolactones in the presence of a catalyst, whereby a reaction mixture is obtained;

b) adding cyclic carbonates to said reaction mixture; and c) ring-opening and polymerizing said cyclic carbonates.

8. Process for preparing the block copolymer of polyesters and polycarbonates according to claim 1, wherein the catalyst is a tin-containing catalyst.

9. A process for preparing a block copolymer of polyesters and polycarbonates comprising a first moiety including at least one of each of the units (I) and (II) having the general formulae:

$$\left[\begin{matrix}O & CH_3\\ \|\\ C-CH_2CH-O\end{matrix}\right]_m \quad (I)$$

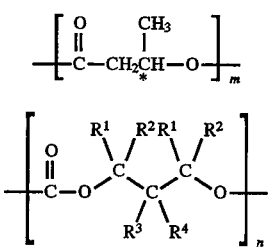
(II)

where the symbol * indicates an asymmetric carbon atom; $R^1$, $R^2$, $R^3$, and $R^4$ are either a hydrogen atom or a methyl group; and m and n are each respective natural numbers ranging from 300 to 5,000, wherein said copolymer comprises block units of (I)-(II), (II)-(I), (I)-(II)-(I), (II)-(I)-(II), (I)-(II)-(X), or (II)-(I)-(X), wherein (I) and (II) are structural units as defined above, and (X) is a structural unit other than (I) or (II), and a second moiety including either further polyesters of a formula corresponding to that of unit (I) or further polycarbonates of a formula corresponding to that of unit (II) but having but having a different monomer constituent from the first moiety, the process comprising a repeatable sequence of steps of:

a) ring-opening and polymerizing optically active β-butyrolactones in the presence of a catalyst, whereby a reaction mixture is obtained;

b) adding cyclic carbonates to said reaction mixture; and c) ring-opening and polymerizing said cyclic carbonates; said process further comprising the step of:

d) adding either optically active β-butyrolactones or cyclic carbonates corresponding to the monomers of unit (II) but differing from those used for steps a) to c) and subsequently ring-opening and polymerizing the added β-butyrolactones or cyclic carbonates; with steps a) to d) being repeatable.

10. Process for preparing the block copolymer of polyesters and polycarbonates according to claim 9, wherein the catalyst is a tin-containing catalyst.

11. Process for preparing the block copolymer of polyesters and polycarbonates according to claim 8, wherein the tin-containing catalyst is a distannoxane having the general formula (III):

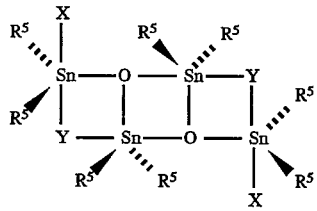
(III)

where $R^5$ indicates an alkyl group having 1 to 12 carbon atoms, an aralkyl group having at most 12 carbon atoms or a phenyl group; X is selected from the group consisting of Cl, Br and NCS; and Y is selected from the group consisting of Cl, Br, NCS, OH, an alkoxy group having 1 to 4 carbon atoms and a phenoxy group.

12. Process for preparing the block copolymer of polyesters and polycarbonates according to claim 10, wherein the tin-containing catalyst is a distannoxane having the general formula (III):

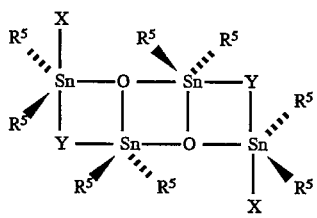
(III)

where $R^5$ indicates an alkyl group having 1 to 12 carbon atoms, an aralkyl group having at most 12 carbon atoms or a phenyl group; X is selected from the group consisting of Cl, Br and NCS; and Y is selected from the group consisting of Cl, Br, NCS, OH, an alkoxy group having 1 to 4 carbon atoms and a phenoxy group.

13. Process for preparing the block copolymer of polyesters and polycarbonates according to claim 11, wherein the distannoxane is 1-ethoxy-3-halogenotetraalkyl distannoxane, the alkyl group having 4 to 12 carbon atoms.

14. Process for preparing the block copolymer of polyesters and polycarbonates according to claim 12, wherein the distannoxane is 1-ethoxy-3-halogenotetraalkyl distannoxane, the alkyl group having 4 to 12 carbon atoms.

15. Biodegradable article comprising the block copolymer of polyesters and polycarbonates according to claim 1.

16. Biocompatible article comprising the block copolymer of polyesters and polycarbonates according to claim 1.

17. Block copolymer of polyesters and polycarbonates comprising a first moiety including at least one of each of the units (I) and (II) having the general formulae:

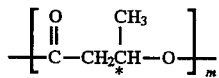
(I)

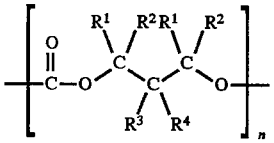
(II)

where the symbol * indicates an asymmetric carbon atom; $R^1$, $R^2$, $R^3$, and $R^4$ are either a hydrogen atom or a methyl group; and m and n are each respective natural numbers ranging from 300 to 5,000, wherein said copolymer comprises block units of (I)-(II), (II)-(I), (I)-(II)-(I), (II)-(I)-(II), (I)-(II)-(X), or (II)-(I)-(X), wherein (I) and (II) are structural units as defined above, and (X) is a structural unit other than (I) or (II); and a second moiety including further polyesters of a formula corresponding to that of unit (I).

18. Block copolymer of polyesters and polycarbonates comprising a first moiety including at least one of each of the units (I) and (II) having the general formulae:

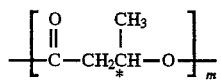
(I)

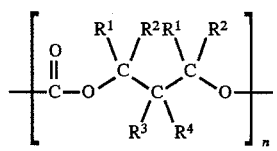
(II)

where the symbol * indicates an asymmetric carbon atom; $R^1$, $R^2$, $R^3$, and $R^4$ are either a hydrogen atom or a methyl group; and m and n are each respective natural numbers ranging from 300 to 5,000, wherein said copolymer comprises block units of (I)-(II), (II)-(I), (I)-(II)-(I), (II)-(I)-(II), (I)-(II)-(X), or (II)-(I)-(X), wherein (I) and (II) are structural units as defined above, and (X) is a structural unit other than (I) or (II); and a second moiety including further polycarbonates of a formula corresponding to that of unit (II) but having a different monomer constituent from the first moiety.

* * * * *